(12) United States Patent
Lahure et al.

(10) Patent No.: US 7,523,774 B2
(45) Date of Patent: Apr. 28, 2009

(54) PNEUMATIC TIRE WITH HIGH TURNUP, LOCKED BEAD CONSTRUCTION

(75) Inventors: Jean-Claude Lahure, Luxembourg (LU); Olivier de Barsy, Eischen (LU); Xavier Sebastien Benolt Fraipont, Ochain (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 559 days.

(21) Appl. No.: 11/038,606

(22) Filed: Jan. 19, 2005

(65) Prior Publication Data

US 2006/0157182 A1    Jul. 20, 2006

(51) Int. Cl.
*B60C 15/00* (2006.01)
*B60C 15/04* (2006.01)
*B60C 15/06* (2006.01)

(52) U.S. Cl. .................. 152/540; 152/539; 152/541; 152/543; 152/546; 152/552; 152/554; 152/555

(58) Field of Classification Search .................. 152/539, 152/541, 546, 547, 549, 552, 554, 555
See application file for complete search history.

(56) References Cited

U.S. PATENT DOCUMENTS

| | | | |
|---|---|---|---|
| 4,019,551 A | 4/1977 | Kolowski et al. |
| 4,139,040 A | 2/1979 | Samoto et al. |
| 4,192,368 A | 3/1980 | Maiocchi |
| 4,726,408 A | 2/1988 | Alie et al. |
| 4,854,361 A | 8/1989 | Gasowski et al. |
| 4,922,985 A | 5/1990 | Gasowski et al. |
| 4,930,560 A | 6/1990 | Lesti et al. |
| 5,058,649 A | 10/1991 | Hoang et al. |
| 5,415,216 A | 5/1995 | Kajiwara et al. |
| 5,431,209 A | 7/1995 | Kajiwara et al. |
| 5,524,688 A | 6/1996 | Trares et al. |

(Continued)

FOREIGN PATENT DOCUMENTS

EP    0 339 511    11/1989

(Continued)

OTHER PUBLICATIONS

European Patent Office, *European Search Report*, Mar. 10, 2006.

(Continued)

*Primary Examiner*—Adrienne C Johnstone
(74) *Attorney, Agent, or Firm*—Wood, Herron & Evans, L.L.P.

(57) ABSTRACT

A pneumatic radial ply tire for heavier load conditions having a reduced weight, high durability bead area. The pneumatic tire includes a tire bead and a carcass ply folded about the bead to define a main body portion and a turnup portion. The turnup portion is folded around the bead and located adjacent the main body portion radially outward of the bead. The turnup portion has a turnup height of approximately 35-45% of the total section height. A thin rubber strip associated with the bead is disposed between the main body portion and the turnup portion and has an insert height of approximately 25% of the total section height. The pneumatic tire further includes a chafer having a maximum chafer gauge of not more than approximately 1.5 times the thickness of the tire side wall.

6 Claims, 2 Drawing Sheets

U.S. PATENT DOCUMENTS

| | | | |
|---|---|---|---|
| 5,679,188 A | 10/1997 | Robinson et al. | |
| 5,779,829 A | 7/1998 | Prakash et al. | |
| 6,079,467 A | 6/2000 | Ueyoko | |
| 6,273,162 B1 | 8/2001 | Ohara et al. | |
| 6,357,498 B1 | 3/2002 | Rayman | |
| 6,408,914 B1 | 6/2002 | Lamock et al. | |
| 6,435,239 B1 | 8/2002 | Mani et al. | |
| 6,527,025 B1 | 3/2003 | Minami | |
| 6,543,504 B2 * | 4/2003 | Auxerre | 152/547 |
| 6,659,148 B1 | 12/2003 | Alie et al. | |
| 6,719,030 B2 | 4/2004 | Prakash et al. | |
| 6,732,776 B2 | 5/2004 | Mani et al. | |
| 6,736,178 B2 | 5/2004 | Ohara et al. | |
| 6,742,559 B2 * | 6/2004 | Iwamura | 152/554 X |
| 2002/0019557 A1 | 2/2002 | Prakash et al. | |
| 2002/0062897 A1 | 5/2002 | Mani et al. | |
| 2002/0157755 A1 | 10/2002 | Mani et al. | |
| 2004/0007305 A1 | 1/2004 | Ueyoko | |

FOREIGN PATENT DOCUMENTS

| | | |
|---|---|---|
| EP | 0 631 889 | 1/1995 |
| EP | 0 798 139 | 10/1997 |
| EP | 0 853 008 | 7/1998 |
| EP | 0 928 708 | 7/1999 |
| EP | 0 958 946 | 11/1999 |
| EP | 0 965 465 | 12/1999 |
| EP | 0 997 325 | 5/2000 |
| EP | 1 110 762 | 6/2001 |
| JP | 2002316519 A * | 10/2002 |
| JP | 2004306823 A * | 11/2004 |

OTHER PUBLICATIONS

Office Action issued in related Chinese Patent Application No. 200510003363.1; Apr. 11, 2008; 11 pages; Patent Office of the People's Republic of China.

* cited by examiner

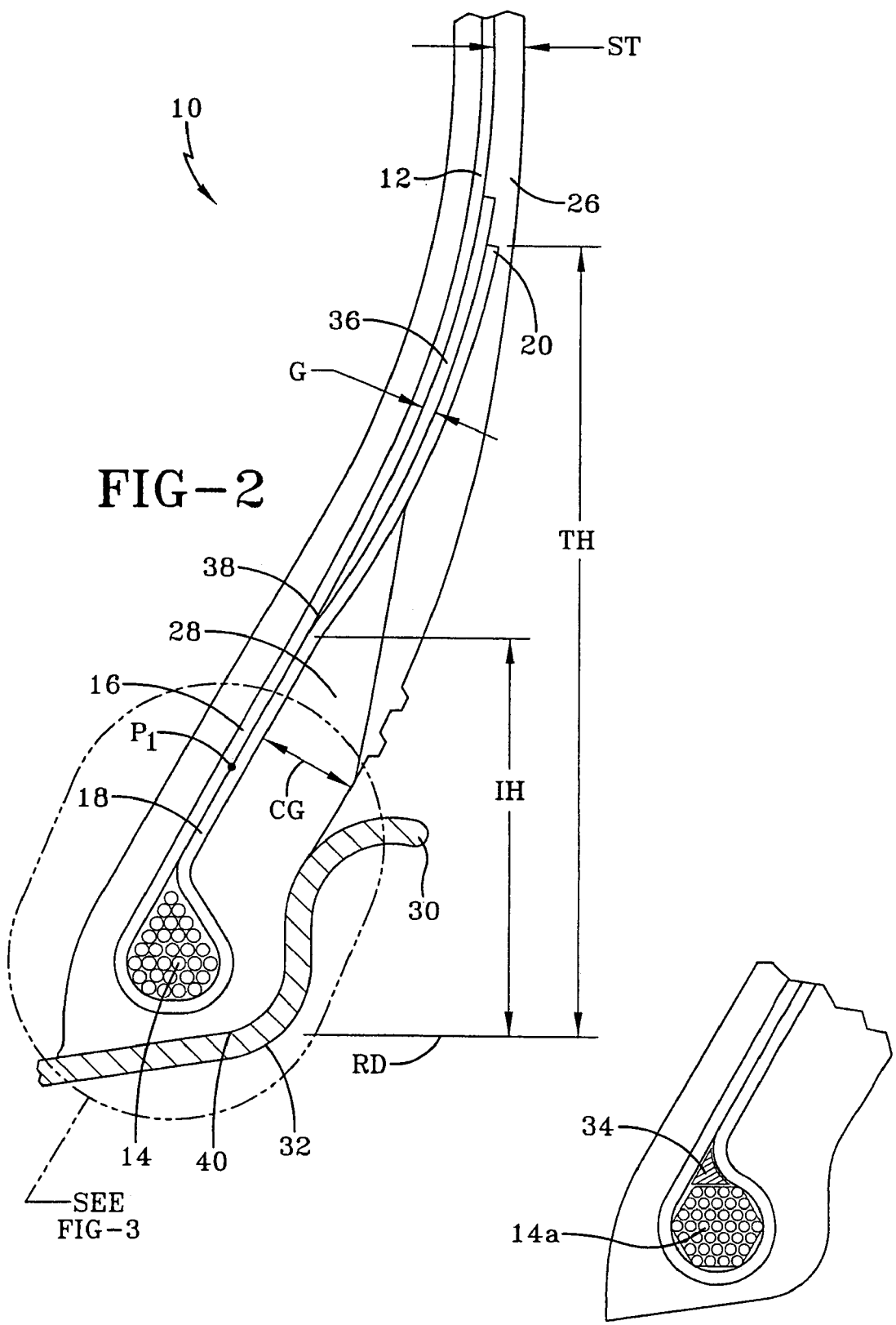

PNEUMATIC TIRE WITH HIGH TURNUP, LOCKED BEAD CONSTRUCTION

CROSS REFERENCE TO RELATED APPLICATION

Pursuant to 37 C.F.R. § 1.78(a)(4), this application claims the benefit of and priority to prior filed co-pending Provisional Application Ser. No. 60/640,745, filed Dec. 30, 2004.

FIELD OF THE INVENTION

The present invention relates to pneumatic tires, and more particularly to pneumatic tires designed for heavier loads and characterized by a reduced weight, high durability bead area.

BACKGROUND OF THE INVENTION

A pneumatic tire typically includes a pair of axially separated inextensible beads having at least one carcass ply extending between the two beads. The carcass ply includes axially opposite end portions each of which is turned up around a respective bead and secured thereto. Tread rubber and sidewall rubber are located axially from and radially outward of, respectively, the carcass ply.

The bead area is one portion of the tire that receives considerable attention during the tire design process. Under conditions of severe operation, the stresses in the bead area can be especially problematic, leading to separation of adjacent components. In particular, the ply turnup ends are prone to separation from adjacent structural elements of the tire. For this reason, a variety of structural design approaches have been used to manage separation of the tire elements in the bead area. These design approaches typically include adding various polymeric materials within the bead area to increase strength and rigidity. In many tire bead designs, one or more fillers or apexes will be disposed between adjacent components. For instance, an apex might be positioned immediately radially outward of the bead and between the carcass main portion and the turnup portion. A second apex might be positioned between the turnup portion and the tire side wall. Many bead designs include additional elements, such as chafers, chippers, toe guards, and clamping members, all designed to improve the durability of the bead area.

Bead area designs including the above-mentioned strengthening elements have some drawbacks, such as increased material costs as well as increased tire weight. To address these drawbacks, tire manufacturers continue to strive for bead area designs that have reduced weight and volume characteristics, yet provide high bead area durability. For certain tire markets, such as the radial light truck (RLT) tire market, manufacturers have made some progress in providing bead area designs with reduced weight and high durability. By way of example, in tires according to U.S. Pat. No. 5,524,688, which is assigned to the assignee of the present invention, a bead area having a locked bead construction includes a turnup portion that wraps around a substantially pentagonal bead without an apex between the main portion and the turnup portion and without a chipper or clamping member. This construction therefore eliminates many of the structural elements in many prior bead area designs, thereby reducing the weight but still providing high bead area durability.

For pneumatic tires used under relatively heavier loads, such as those for the radial medium truck (RMT) tire market, the volume of the various strengthening elements are typically increased to support the increased loads, thereby further increasing the material costs and weight of the bead area. Consequently, as with the RLT tire market, manufacturers desire bead area designs having reduced volume and weight characteristics that further provide high bead area durability. However, applying the teachings and techniques of the RLT tire market, such as that found in U.S. Pat. No. 5,524,688, to tires designed for heavier loads, such as RMT tires, often results in unacceptable stress concentrations in the bead area which may lead to ply separation and tire failure.

Thus, there continues to be a need for a simplified bead area design for heavier load radial tires that reduces the weight of the bead area yet provides high bead area durability.

SUMMARY OF THE INVENTION

A pneumatic tire, and particularly a pneumatic tire for heavier loads, includes a tire bead and a carcass ply folded about the bead so as to define a main body portion and a turnup portion associated with the bead. The turnup portion is folded around the bead and located adjacent the main body portion radially outward of the bead. The turnup portion has a turnup height between approximately 35-45%, and preferably approximately 40%, of the total section height. A rubber strip is associated with the bead and includes inner and outer ends. At least a portion of the rubber strip is disposed between the main body portion and the turnup portion so that the inner end of the rubber strip has an insert height of approximately 25% of the total section height. Additionally, the pneumatic tire includes a chafer associated with the bead and located axially outward thereof. The chafer has a maximum chafer gauge of not more than approximately 1.5 times the thickness of the tire side wall.

In one embodiment, the bead has a substantially pentagonal radial cross-sectional shape. In another embodiment, the bead has a substantially hexagonal radial cross-sectional shape. In the latter embodiment, an apex is disposed between the main body portion and the turnup portion immediately radially outward of the bead. The apex is relatively small, having a radial height of not more than approximately 1.3 cm. Moreover, there is a relationship between the thickness, or gauge, of the rubber strip and the turnup height of the turnup portion.

By virtue of the foregoing, there is provided an improved pneumatic tire, and particularly a pneumatic tire for heavier loads, that eliminates many of the structural features in typical bead area constructions, thus providing a reduced weight bead area, without sacrificing bead area durability.

BRIEF DESCRIPTION OF THE DRAWINGS

The accompanying drawing, which is incorporated in and constitutes a part of this specification, illustrates an embodiment of the invention and, together with a general description of the invention given above, and the detailed description given below, serves to explain the invention.

FIG. 2 is a cross-sectional view of the bead area of a pneumatic tire in accordance with the invention mounted upon a rim; and FIG. 3 is a cross-sectional view of an alternate embodiment of the bead area of a pneumatic tire in accordance with the invention.

DEFINITIONS

Figure 1:
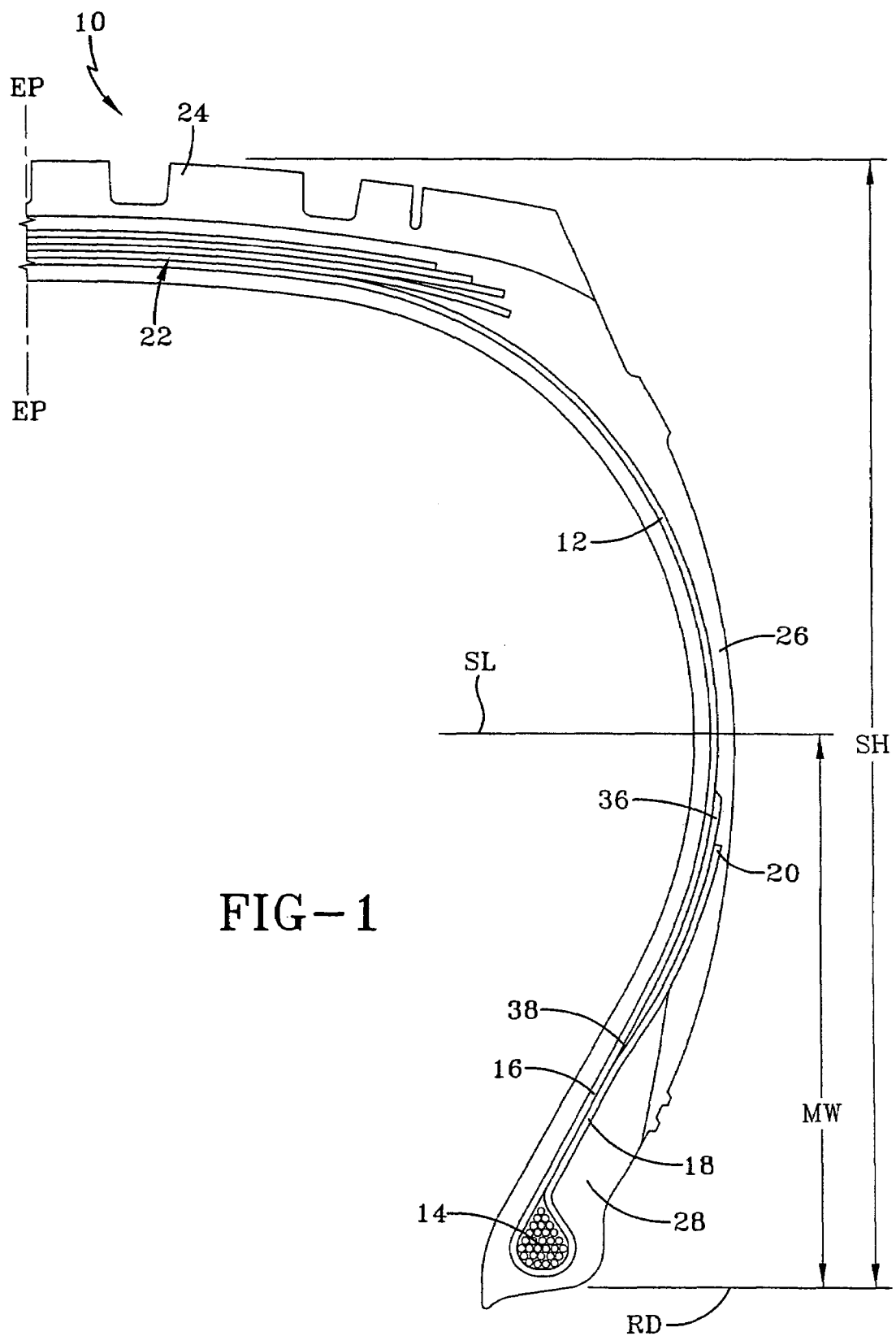
FIG. 1 is a partial cross-sectional view of a pneumatic tire in accordance with the invention.

"Apex" means an elastomeric filler located radially outward of the bead and between the plies and the turnup ply.

"Axial" and "axially" mean the lines or directions that are parallel to the axis of rotation of the tire.

"Bead" means that part of the tire comprising an annular tensile member wrapped by ply cords and shaped to fit the design rim, without other reinforcement elements such as chippers, apexes, toe guards and chafers.

"Bead area" means that portion of the tire surrounding the bead.

"Carcass" means the tire structure apart from the belt structure, tread, undertread, and sidewall rubber over the plies, but including the beads.

"Chafer" means a strip of material placed around the outside of the bead to protect cord plies from the rim, distribute flexing about the rim, and to seal the tire.

"Chipper" means a narrow band of fabric or steel cords located in the bead area whose function is to reinforce the bead area and stabilize the radially inward most part of the side wall.

"Cord" means one of the reinforcement strands of which the plies in the tire are comprised.

"Crown" refers to substantially the outer circumference of a tire where the tread is disposed.

"Equatorial plane (EP)" means the plane perpendicular to the tire's axis of rotation and passing through the center of its tread.

"Flipper" means a reinforcing fabric around the bead wire for strength and to tie the bead wire in the tire body.

"Gauge" means a measurement and specifically to thickness.

"Inner" and "inward" means toward the tire's interior.

"Insert height" means the radial distance between the nominal rim diameter and the inner edge of the rubber strip or insert.

"Outer" and "outward" means toward the tire's exterior.

"Ply" means a continuous layer of rubber-coated parallel cords.

"Pneumatic tire" means a laminated mechanical device of generally toroidal shape, usually an open-torus having beads and a tread and made of rubber, chemicals, fabric and steel or other materials.

"Radial" and "radially" mean directions radially toward or away from the axis of rotation of the tire.

"Radial cross section" means a cross section taken in the plane which contains the axis of rotation of a tire or tire and rim assembly.

"Radial tire" means a belted or circumferentially-restricted pneumatic tire in which the ply cords which extend from bead to bead are laid at cord angles between 65° and 90° with respect to the equatorial plane of the tire.

"Sectional width line" means a line parallel in the cross-section of the tire to its axis of rotation and which is located at the tire's point of maximum axial width.

"Side wall" means that portion of a tire between the tread and the bead area.

"Substantially hexagonal" means a six sided radial cross section, even though some or all of the sides may be curvilinear rather than rectilinear, as in a regular hexagon.

"Substantially pentagonal" means a five sided radial cross section, even though some or all of the sides may be curvilinear rather than rectilinear, as in a regular pentagon.

"Toe guard" means the circumferentially deployed elastomeric rim-contacting portion of the tire axially inward of each bead.

"Total section height" means the radial distance between the nominal rim diameter to the maximum outer diameter of the tire.

"Tread" means a molded rubber component which, when bonded to a tire casing, includes that portion of the tire that comes into contact with the road when the tire is normally inflated and under normal load.

"Turnup height" means the radial distance between the nominal rim diameter and the outer edge of the turnup portion or ply.

"Turnup ply" and "turnup portion" refers to a portion of a carcass ply that wraps around one bead only.

DETAILED DESCRIPTION

The present invention is directed to a bead area design for heavier load tires that provides a simplified bead area construction that is lower in weight than conventional constructions yet provides high bead area durability. To accommodate heavier loads, conventional bead area constructions include high volume and weight strengthening elements such as multiple apexes, chippers, toe guards and clamping members. The present invention, through several bead area design features, eliminates many of these strengthening elements, thereby reducing the weight of the bead area. Moreover, the design features allow for this reduction in weight without negatively impacting the durability of the bead area.

With reference to FIGS. 1 and 2, a pneumatic tire, generally shown at 10, includes at least one carcass ply 12 that extends and wraps around a pair of beads 14, which each comprise a plurality of wraps of a single metallic filament. For simplicity, only half of tire 10 is depicted in the drawings with the other half being a substantial mirror image of the half depicted across equatorial plane EP. The carcass ply 12 includes a main body portion 16 and a turnup portion 18 having a radial outer turnup end 20. The tire 10 also includes a plurality of belt plies 22 located radially outward of the carcass ply 12 in a crown portion of the tire 10. An elastomeric tread portion 24 is disposed radially outward of the belt plies 22. A side wall portion 26 extends radially inward from the tread portion 24 toward bead 14. The bead area further includes a chafer 28 located axially outward of carcass ply 12 and bead 14 and extends from a radially inner end located radially inward of the radially outermost extent of the bead 14, to a radially outer end which is disposed radially outward of the flange 30 of rim 32. As shown in the drawings, the rim 32 may be a flat base, or 5° tapered rim. It is believed, however, that the present invention may also be utilized on other rims, such as a Drop Center Tubeless having a 15° tapered rim.

Turnup portion 18 is disposed back against main body portion 16 immediately above bead 14 and extends radially outward against main body portion 16. The positioning of turnup portion 18 against main body portion 16 decreases bending strains in the cords (not shown) of carcass 12 and limits force variations between the main body portion 16 and turnup portion 18. The turnup portion 18 should mate with the main body portion 16 immediately after the bead 14. To this end, and as shown in the embodiment in FIGS. 1 and 2, bead 14 may have a radial cross-sectional shape which is substantially pentagonal, wherein the radially outermost extent of the bead 14 is a vertex of two of the sides of the pentagon to facilitate mating of the turnup portion 18 to main body portion 16. The pentagonal shape is particularly advantageous in that no apex is used between main body portion 16 and turnup portion 18 immediately adjacent bead 14, as in many previous bead area designs. Furthermore, the pentagonal shape of the bead 14 complements the natural pressures between the tire 10 and the rim 32 in holding the bead 14 on the rim 32 when the tire 10 is inflated.

While the pentagonal shape of bead 14 is advantageous, other bead 14 configurations may also be used in the invention. For example, and as shown in FIG. 3 in which like reference numerals refer to like features in FIG. 2, it is within the scope of the invention to use a substantially hexagonal bead 14a. In this case, a small apex 34 is used between the main body portion 16 and turnup portion 18 immediately adjacent hexagonal bead 14a. In this embodiment, the apex 34 is relatively small, as compared to other bead area designs, having a radial height of no more than about 1.3 cm. For hexagonal bead 14a, the apex 34 not only aids in mating turnup portion 18 to main body portion 16, but also prevents any air pockets from being trapped in the side wall 26 of the tire 10 during manufacturing.

Referring back to FIG. 2, the carcass ply 12 is turned up or wrapped against the bead 14 and locked against the main body portion 16 of carcass ply 12 by side wall 26. Using the nominal rim diameter RD as a reference, the turnup end 20 of turnup portion 18 has a turnup height TH between approximately 35-45%, and more preferably approximately 40%, of the total section height SH. In this respect, the turnup height TH of the invention represents a significant increase over previous locked bead constructions, such as those shown in U.S. Pat. No. 5,524,688, which typically have a turnup height of approximately 25% of the total section height SH. For tires sustaining higher loads, such as RMT tires, Finite Element (FE) analysis showed that conventional turnup heights resulted in unacceptable stress concentrations around turnup end 20. FE analysis further showed, however, that these stresses may be reduced by extending the turnup in the radially outward direction, thereby increasing the turnup height TH.

As further shown in FIG. 2, the bead area design of the invention also includes a thin rubber strip 36 positioned between the turnup portion 18 and main body portion 16 radially outward of bead 14. FE analysis has shown that the rubber strip 36 further reduces stresses in the region adjacent the turnup end 20, thereby reducing the likelihood of ply separation and tire failure. The rubber strip 36 has an inner end 38 radially inward of the turnup end 20 and an outer end that is generally at least coextensive with the turnup portion 28, and preferably is slightly radially outward of turnup end 20. The excess amount of rubber strip 36 may allow for separation of the strip and turnup end 20, may accommodate manufacturing variations, or may simply provide tapering of the rubber strip itself.

The rubber strip 36 is positioned between the main portion 16 and turnup portion 18 so that the inner end 38 has an insert height IH that is approximately 25% of the total section height SH. In one aspect of the invention, there is a relation between the thickness, or gauge, G, of the rubber strip 36 and the turnup height TH. In particular, the gauge G of the rubber strip 36 may be determined from the equation:

$$\frac{G}{G_{ref}} = \frac{MW - IH}{TH - IH}.$$

In this equation, $G_{ref}$ is a reference gauge thickness which is defined to be the distance between the cords (not shown) of the main body portion 16 and turnup portion 18 at a location $P_1$ between the bead 14 and inner end 38 of rubber strip 36. In general, this value is approximately 1-3 times the cord diameter. Additionally, MW is the radial height of the sectional width line SL relative to the nominal rim diameter RD when the tire 10 is inflated. Although it is preferable that the inner end 38 of rubber strip 36 have an insert height IH of approximately 25% of the total section height SH, the rubber strip 36 may extend radially inward toward bead 14. For some applications, the rubber strip 36 may extend all the way to the bead 14 so that there is essentially no region where main portion 16 and turnup portion 18 are in direct contact. In this case, however, the gauge G of the rubber strip 36 may still be determined by the equation above.

In another aspect of the invention, the chafer 28 is designed to have a minimized chafer gauge. For example, in many higher load applications, the thickness of the chafer is significantly increased to provide strength and durability to the bead area. A reference gauge of a chafer may be the thickness of the side wall 16, which mates with the radially outer end of chafer 28, the side wall thickness being designated ST. As compared to the thickness ST of the side wall 16, many chafers have a maximum chafer gauge of between 2-3 times the side wall thickness ST. Additionally, the increased thickness may extend over a substantial portion of the chafer. In the invention, however, the maximum chafer gauge CG never exceeds approximately 1.5 times the side wall thickness ST. This allows for a thinner chafer 28 and consequently a bead area having a reduced weight.

A minimized chafer 28 may be utilized in the present invention as a result of a purpose-designed mold shape in the lower side wall 26 during the manufacturing of tire 10. In one aspect of the mold shape, the portion of the bead area in contact with the rim 32, generally designated as 40, is configured such that when the tire is mounted to the rim and fully inflated to normal pressure, the shape of the rim engaging portion 40 is substantially the same as the shape of the rim 32. In this way, the tire 10 may be mounted to rim 32 without excessive stresses or bending existing in the bead area prior to actual use of tire 10. This same approach is also taken with the shape of the lower side wall 26, including the radially outer portion of the chafer 28. To this end, the shape, or curvature, of the lower side wall 16 during the molding process is designed to closely match the curvature of the inflated tire 10 so as to build the desired pre-stress in the rubber of the main body portion 16 and turnup portion 18.

The pneumatic tire 10 in accordance with the present invention is characterized by a bead area having a locked bead construction that advantageously provides reduced weight and high bead area durability under heavier load conditions. This can be done because the invention does not use multiple apexes, clamping members, chippers or toe guards that add a significant amount of weight to the bead area. Moreover, as compared to conventional locked bead constructions, such as that for the RLT tire market, the invention calls for a significantly increased turnup height TH such that the turnup end 20 of turnup portion 18 is increased by approximately 15% as compared to conventional designs. In addition, a rubber strip 36 is inserted between the main body portion 16 and turnup portion 18. An equation provides the gauge G of the rubber strip 36 that is related to the turnup height TH. Furthermore, a chafer 28 having a minimized chafer gauge CG is used in the bead area. The minimized chafer 28 may be used due to the purpose-designed mold shape of the lower side wall during the manufacturing process.

Thus, through the aforementioned bead area design features of the present invention, many of the strengthening elements used in conventional higher load bead area constructions have been eliminated. In the invention, there are no multiple apexes, chippers, toe guards, or clamping members, but a thin rubber strip is located between the main body portion and the turnup portion. This construction is lighter in weight than prior art constructions, which provides various operating efficiencies. Additionally, the construction has high bead area durability under the heavier load conditions.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A pneumatic radial ply tire comprising:
 a tire bead;
 a carcass ply folded about the bead so as to define a main body portion and a turnup portion, the turnup portion folded around the bead and located adjacent the main body portion radially outward of the bead, the turnup portion having a turnup height between approximately 35-45% of a total section height; and
 a rubber strip having inner and outer ends, at least a portion of the rubber strip disposed between the main body portion and the turnup portion, the inner end of the rubber strip having an insert height of approximately 25% of the total section height,
 wherein the turnup portion contacts the main body portion at least at one point between the bead and the inner end of the rubber strip.

2. The pneumatic tire of claim 1, wherein the bead has a substantially pentagonal radial cross-sectional shape.

3. The pneumatic tire of claim 1, wherein the bead has a substantially hexagonal radial cross-sectional shape.

4. The pneumatic tire of claim 3, further comprising:
 an apex located between the main body portion and the turnup portion immediately radially outward of the bead, the apex having a radial height of not more than approximately 1.3 cm.

5. The pneumatic tire of claim 1, wherein the rubber strip has a thickness (G) that depends on the turnup height (TH) of the turnup portion, the insert height (IH) of the rubber strip, the radial height (MW) at a sectional width line when the tire is inflated, and a reference gauge thickness ($G_{ref}$), wherein the dependency is give by the equation $$\frac{G}{G_{ref}} = \frac{MW - IH}{TH - IH}.$$

6. The pneumatic tire of claim 1, further comprising:
 a side wall having a thickness; and
 a chafer located axially outward thereof, the chafer having a maximum chafer gauge of not more than approximately 1.5 times the side wall thickness.

* * * * *